US008920138B2

United States Patent
Schiffhauer et al.

(10) Patent No.: US 8,920,138 B2
(45) Date of Patent: Dec. 30, 2014

(54) MOTOR PUMP UNIT

(75) Inventors: Walter Schiffhauer, Leutenbach (DE); Lanfranco Pol, Quistello Mn (IT)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 102 days.

(21) Appl. No.: 13/197,898

(22) Filed: Aug. 4, 2011

(65) Prior Publication Data
US 2012/0195772 A1 Aug. 2, 2012

Related U.S. Application Data

(63) Continuation of application No. PCT/EP2009/001026, filed on Feb. 13, 2009.

(51) Int. Cl.
| | |
|---|---|
| *F04B 39/06* | (2006.01) |
| *F04B 35/04* | (2006.01) |
| *F04B 17/03* | (2006.01) |
| *F04B 1/12* | (2006.01) |
| *F04B 1/14* | (2006.01) |
| *F04B 53/08* | (2006.01) |
| *H02K 5/20* | (2006.01) |
| *H02K 7/14* | (2006.01) |
| *H02K 9/19* | (2006.01) |

(52) U.S. Cl.
CPC . *F04B 17/03* (2013.01); *F04B 1/12* (2013.01); *F04B 1/145* (2013.01); *F04B 35/04* (2013.01); *F04B 39/06* (2013.01); *F04B 39/064* (2013.01); *F04B 53/08* (2013.01); *H02K 5/20* (2013.01); *H02K 7/14* (2013.01); *H02K 9/19* (2013.01)
USPC .............................. 417/371; 417/366; 417/368

(58) Field of Classification Search
CPC ...... F04C 29/045; F04B 39/06; F04D 29/588; F04D 29/5893

USPC ........................................ 417/366, 371, 368
See application file for complete search history.

(56) References Cited

U.S. PATENT DOCUMENTS

| | | | |
|---|---|---|---|
| 1,431,907 A | 10/1922 | Cramer | |
| 1,614,091 A | 1/1927 | Van Toff | |
| (Continued) | | | |

FOREIGN PATENT DOCUMENTS

| | | |
|---|---|---|
| DE | 926 676 | 4/1955 |
| DE | 27 16 184 | 10/1977 |
| (Continued) | | |

OTHER PUBLICATIONS

Patent Abstracts of Japan, Abstract of Japanese Patent "Scroll-Type Fluid Machine", Publication No. 61250393, Nov. 7, 1986, Japanese Application No. 60091533, Filed Apr. 26, 1985.

(Continued)

*Primary Examiner* — Alexander Comley
(74) *Attorney, Agent, or Firm* — Lipsitz & McAllister, LLC

(57) ABSTRACT

A motor pump unit for a high-pressure cleaning apparatus has an electric motor and a pump. The electric motor has a motor housing that is surrounded by a cooling housing with an annular space having an annular space inlet and an annular space outlet formed therebetween. The pump has a drive housing on which is supported the motor shaft, and has a suction inlet and a pressure outlet. The annular space outlet is fluidly connected to the suction inlet and liquid to be pressurized by the pump is suppliable to the annular space inlet. In order to improve the motor pump unit such that the heat load on the drive housing can be reduced, the drive housing has at least one cooling passage which is arranged upstream of the suction inlet and through which the liquid to be pressurized can flow.

7 Claims, 3 Drawing Sheets

(56) References Cited

U.S. PATENT DOCUMENTS

| | | | |
|---|---|---|---|
| 2,037,245 A | | 4/1936 | Leifheit et al. |
| 2,301,063 A | | 11/1942 | McConaghy |
| 2,734,459 A | | 2/1956 | Zimsky |
| 2,763,214 A | * | 9/1956 | White .......................... 417/357 |
| 2,782,720 A | | 2/1957 | Dochterman |
| 2,784,672 A | * | 3/1957 | Wallace ........................ 417/370 |
| 2,854,595 A | | 9/1958 | Arutunoff |
| 2,913,988 A | * | 11/1959 | White .......................... 417/357 |
| 2,914,253 A | | 11/1959 | Jobus et al. |
| 2,993,449 A | * | 7/1961 | Harland ........................ 417/357 |
| 3,135,213 A | * | 6/1964 | Smith et al. ................... 417/368 |
| 3,371,613 A | | 3/1968 | Dahlgren et al. |
| 3,426,691 A | | 2/1969 | Anderson |
| 3,434,656 A | * | 3/1969 | Bellmer ........................... 418/94 |
| 3,525,001 A | * | 8/1970 | Erickson .......................... 310/54 |
| 3,667,870 A | | 6/1972 | Yoshida et al. |
| 3,738,781 A | | 6/1973 | Hagemann et al. |
| 3,744,935 A | | 7/1973 | Magni |
| 3,992,133 A | | 11/1976 | Brunner |
| 4,480,967 A | * | 11/1984 | Schulze ........................ 417/368 |
| 4,516,044 A | | 5/1985 | Bone |
| 4,648,809 A | | 3/1987 | Gensberger |
| 4,700,092 A | | 10/1987 | Bincoletto |
| 4,808,087 A | | 2/1989 | Tsutsui et al. |
| 4,844,701 A | | 7/1989 | Wolford et al. |
| 4,878,804 A | | 11/1989 | Akerman et al. |
| 4,922,148 A | | 5/1990 | Kitamura |
| 4,934,914 A | | 6/1990 | Kobayashi et al. |
| 4,958,988 A | | 9/1990 | Regev |
| 5,040,950 A | * | 8/1991 | Dalquist et al. ............... 417/234 |
| 5,113,103 A | | 5/1992 | Blum et al. |
| 5,145,335 A | | 9/1992 | Abelen et al. |
| 5,174,730 A | | 12/1992 | Nieuwkamp et al. |
| 5,240,391 A | | 8/1993 | Ramshankar et al. |
| 5,250,863 A | | 10/1993 | Brandt |
| 5,283,915 A | | 2/1994 | Idland et al. |
| 5,293,089 A | * | 3/1994 | Frister ............................. 310/54 |
| 5,326,235 A | | 7/1994 | Bruhn |
| 5,332,369 A | * | 7/1994 | Jensen .......................... 417/369 |
| 5,349,147 A | | 9/1994 | Gallone |
| 5,350,281 A | | 9/1994 | Hagshenas |
| 5,354,182 A | | 10/1994 | Niemiec et al. |
| 5,363,674 A | | 11/1994 | Powell |
| 5,388,970 A | | 2/1995 | Muckelmann et al. |
| 5,395,214 A | | 3/1995 | Kawahara et al. |
| 5,533,875 A | | 7/1996 | Crum et al. |
| 5,616,973 A | | 4/1997 | Khazanov et al. |
| 5,772,411 A | | 6/1998 | Crum et al. |
| 5,930,852 A | * | 8/1999 | Gravatt et al. .................. 4/541.1 |
| 5,938,389 A | | 8/1999 | Shore et al. |
| 5,997,261 A | | 12/1999 | Kershaw et al. |
| 6,000,917 A | | 12/1999 | Smerud et al. |
| 6,017,204 A | | 1/2000 | Holzapfel et al. |
| 6,068,459 A | | 5/2000 | Clarke et al. |
| 6,074,141 A | | 6/2000 | Ishikawa et al. |
| 6,074,185 A | | 6/2000 | Protos |
| 6,132,183 A | | 10/2000 | Li et al. |
| 6,146,113 A | | 11/2000 | Fassnacht et al. |
| 6,175,173 B1 | | 1/2001 | Stephan et al. |
| 6,191,511 B1 | | 2/2001 | Zysset |
| 6,300,693 B1 | | 10/2001 | Poag et al. |
| 6,322,332 B1 | | 11/2001 | Jensen et al. |
| 6,398,530 B1 | | 6/2002 | Hasemann |
| 6,439,861 B1 | * | 8/2002 | Shieh ............................ 417/371 |
| 6,814,551 B2 | | 11/2004 | Kammhoff et al. |
| 6,871,512 B2 | * | 3/2005 | Tsunoda ......................... 62/505 |
| 7,005,765 B1 | | 2/2006 | Schulz et al. |
| 7,063,519 B2 | | 6/2006 | Agrawal et al. |
| 7,182,583 B2 | * | 2/2007 | Gandrud et al. .............. 417/371 |
| 7,591,147 B2 | | 9/2009 | Masoudipour et al. |
| 8,147,216 B2 | | 4/2012 | Schiffhauer et al. |
| 2003/0031570 A1 | | 2/2003 | Kammhoff et al. |
| 2005/0175479 A1 | | 8/2005 | Gandrud et al. |
| 2010/0047091 A1 | | 2/2010 | Schiffhauer et al. |

FOREIGN PATENT DOCUMENTS

| | | |
|---|---|---|
| DE | 29 20 883 | 12/1980 |
| DE | 81 11 792 | 8/1981 |
| DE | 30 17 117 | 11/1981 |
| DE | 35 45 665 | 7/1987 |
| DE | 85 36 175 | 7/1987 |
| DE | 36 03 423 | 8/1987 |
| DE | 37 38 592 | 5/1989 |
| DE | 38 17 641 | 11/1989 |
| DE | 41 05 349 | 8/1992 |
| DE | 94 17 662 | 2/1995 |
| DE | 196 04 447 | 2/1997 |
| DE | 196 52 706 | 6/1997 |
| DE | 197 16 758 | 10/1998 |
| DE | 199 10 460 | 9/2000 |
| DE | 102 47 310 | 4/2004 |
| DE | 103 05 812 | 9/2004 |
| DE | 103 07 813 | 9/2004 |
| DE | 10 2005 046 120 | 3/2007 |
| DE | 10 2007 009 394 | 8/2008 |
| EP | 0 177 925 | 4/1986 |
| EP | 0 314 607 | 5/1989 |
| EP | 0 627 558 | 12/1994 |
| EP | 0 735 270 | 10/1996 |
| EP | 0 819 852 | 1/1998 |
| EP | 0718957 | 2/1998 |
| FR | 2 473 912 | 7/1981 |
| FR | 2 504 206 | 10/1982 |
| JP | 51-31103 | 8/1949 |
| JP | 61-9566 | 1/1986 |
| JP | 61-110877 | 7/1986 |
| JP | 63257434 | 10/1988 |
| JP | 213135 | 1/1990 |
| JP | 387836 | 9/1991 |
| JP | 06016186 | 1/1994 |
| JP | 09-014199 | 1/1997 |
| JP | 10-009135 | 1/1998 |
| JP | 10317964 | 12/1998 |
| JP | 11022482 | 1/1999 |
| JP | 11062607 | 3/1999 |
| JP | 11270885 | 10/1999 |
| JP | 2000130800 | 5/2000 |
| JP | 2003193837 | 7/2003 |
| JP | 2003-232280 | 8/2003 |
| JP | 2005306153 | 11/2005 |
| JP | 2006291744 | 10/2006 |
| JP | 2007-002713 | 1/2007 |
| JP | 2008039251 | 2/2008 |
| WO | 02/23699 | 3/2002 |
| WO | 2008101594 | 8/2008 |

OTHER PUBLICATIONS

Patent Abstracts of Japan, Abstract of Japan Patent "Scroll Type Hydraulic Unit", Publication No. 02196182, Aug. 2, 1990, Japanese Application No. 01015979, Filed Jan. 24, 1989.

Patent Abstracts of Japan, Abstract of Japanese Patent "Scroll Compressor", Publication No. 10220382, Aug. 18, 1998, Japanese Application No. 09022829, Filed Feb. 5, 1997.

* cited by examiner

MOTOR PUMP UNIT

This application is a continuation of international application number PCT/EP2009/001026 filed on Feb. 13, 2009.

The present disclosure relates to the subject matter disclosed in international application number PCT/EP2009/001026 filed on Feb. 13, 2009, which is incorporated herein by reference in its entirety and for all purposes.

BACKGROUND OF THE INVENTION

The invention relates to a motor pump unit for a high-pressure cleaning apparatus having an electric motor and a pump, wherein the electric motor comprises a motor housing that is surrounded by a cooling housing with an annular space having an annular space inlet and an annular space outlet formed therebetween, and wherein the pump has a drive housing on which is supported a motor shaft of an electric motor, and has a suction inlet for drawing in liquid and a pressure outlet for discharging pressurized liquid, wherein the annular space outlet is fluidly connected to the suction inlet and wherein liquid to be pressurized by the pump can be supplied to the annular space inlet.

A motor pump unit of this type is known from DE 10 2007 009 394 A1. It is used in a high-pressure cleaning apparatus by means of which a liquid, preferably water, can be supplied to a pump space via the suction inlet, pressurized and then discharged via the pressure outlet. The pressure outlet can have connected to it a pressure hose which may, for example, have a spray lance arranged at its free end, so that pressurized liquid can, for example, be directed towards an object to be cleaned.

The pump is driven by an electric motor which can be cooled by the liquid that is supplied to the suction inlet of the pump. To this end, the motor housing is surrounded by a cooling housing, wherein an annular space having an annular space inlet and an annular space outlet is formed between the cooling housing and the motor housing. The liquid to be pressurized by the pump can first be supplied to the annular space inlet, then flow through the annular space and subsequently be supplied to the suction inlet by way of the annular space outlet. It is thus possible to dispense with additional air cooling as is often provided in electric motors. Instead, the waste heat from the electric motor is dissipated to the liquid to be pressurized by the pump. This has the advantage of making the motor pump unit suitable for being inserted in a splash-proof housing of the high-pressure cleaning apparatus without having to provide inlet and outlet air openings in the housing of the high-pressure cleaning apparatus.

However, during operation of the motor pump unit, not only does the electric motor heat up but also the drive housing of the pump experiences considerable heat load. One reason for this is that the motor shaft is supported on the drive housing.

SUMMARY OF THE INVENTION

In accordance with an embodiment of the invention, a motor pump unit is provided in which the heat load on the drive housing can be reduced.

In accordance with an embodiment of the invention, the motor pump unit comprises a drive housing having at least one cooling passage which is arranged upstream of the suction inlet and through which the liquid to be pressurized can flow.

In the motor pump unit in accordance with the invention, the liquid to be pressurized by the pump flows through not only the annular space surrounding the motor housing but also a cooling passage of the drive housing. Thus, the drive housing can be cooled by the liquid to be transported, before the latter is supplied to the suction inlet of the pump. The heat load imposed on the drive housing can thus be considerably reduced. This in turn increases the service life of the motor pump unit because it makes it possible in particular to remove the heat that occurs at the bearing via which the motor shaft is held for rotation on the drive housing.

The drive housing and the at least one cooling passage form a one-piece component. This not only allows the drive housing, including cooling passage, to be produced cost-effectively, but also reduces the thermal resistance between the at least one cooling passage and a base body of the drive housing.

It is particularly advantageous for the drive housing to have a first cooling passage and a second cooling passage, wherein the first cooling passage is connected to the annular space inlet and the second cooling passage is connected to the annular space outlet. With the motor pump unit configured in this manner, the liquid to be pressurized by the pump can first be supplied to the first cooling passage. The liquid flows through the first cooling passage and then enters the annular space surrounding the motor housing via the annular space inlet, passes therethrough and then reaches the second cooling passage of the drive housing by way of the annular space outlet, with said second cooling passage being fluidly connected to the suction inlet via (for example) a connecting conduit. As a result, the liquid to be transported by the pump passes through the first cooling passage and the second cooling passage, ensuring particularly effective heat transfer.

It is advantageous for the two cooling passages to be arranged parallel to each other. In particular, it may be provided for the two cooling passages to be aligned parallel to the motor shaft.

In an advantageous embodiment, particularly effective cooling of the drive housing is ensured by the drive housing, including the at least one cooling passage, being made of metal, in particular a pressure die cast metal alloy, for example an aluminium alloy. This enables particularly effective heat transfer from the area of the drive housing that supports the motor shaft to the at least one cooling passage, from where the heat can be dissipated to the liquid to be pressurized.

In a particularly preferred embodiment, the drive housing has a base body which is connected in one piece to a cooling passage via at least one heat-conductive rib projecting outward from the base body. It has been shown that by providing a heat-conductive rib between the base body of the drive housing and the cooling passage, a particularly low thermal resistance can be achieved between the base body and cooling passage.

In particular, it may be provided for the drive housing to have two heat-conductive ribs aligned parallel to each other, each arranged between a cooling passage and the base body. The two heat-conductive ribs not only add to the mechanical stability of the drive housing, but also permit a particularly low thermal resistance to be obtained between the base body of the drive housing and the cooling passages.

It is advantageous for the drive housing to have a bearing sleeve which supports the motor shaft via bearing elements and which is surrounded by a circumferential wall section of the drive housing with an annular interspace formed therebetween, wherein winding heads of the electric motor protrude into the interspace and wherein the at least one cooling passage is integrally formed on the outer side of the circumferential wall section. Thus, the winding heads of the electric motor facing towards the drive housing are surrounded radially inside by the bearing sleeve and radially outside by the circumferential wall section of the drive housing. On its outside, the circumferential wall section has at least one cooling passage integrally formed thereon. This permits particularly effective cooling not only of the bearing sleeve supporting the motor shaft but also of the winding heads extending into the interspace, because the heat emanating from the winding heads can be dissipated to the liquid-cooled drive housing over a large surface area.

It is favourable for the drive housing to surround a swash drive held on the motor shaft. The swash drive can have a swash body which is connected to the motor shaft for rotation therewith and on which a swash plate is supported for rotation. Pistons of the pump can contact the swash plate in a conventional manner, said pistons being driven for reciprocating movement by the swash plate and each protruding into a pump space, so that, owing to the reciprocating movement of the pistons, liquid can be drawn into the pump space and can then be discharged therefrom under pressure. By providing the liquid-cooled drive housing, it is also possible to dissipate effectively heat resulting in the area of the swash drive to the liquid to be pressurized.

In an advantageous embodiment of the invention, the cooling housing is configured in the form of a cylindrical shell which can be slid in an axial direction onto the motor housing and can be detachably connected to the drive housing with a liquid-tight connection established between the at least one cooling passage and the annular space inlet or the annular space outlet. This makes the motor pump unit particularly easy to assemble.

The cooling housing is preferably made of a plastics material and may, for example, be screwed to the drive housing. The cooling housing made of a plastics material surrounds the motor housing only in a circumferential direction. This enables the mechanical load on the cooling housing to be reduced. This is of particular importance where the pump is fed from a public water supply network in which the liquid to be transported is already subject to a liquid pressure of, for example, 5 bar or more. This liquid pressure then also exists in the annular space surrounding the motor housing, and the cooling housing made of a plastics material has to withstand this pressure. A cylindrical shell shaped configuration has proven to be particularly suited to this purpose.

The following description of a preferred embodiment of the invention, taken in conjunction with the drawings, serves to explain the invention in greater detail.

DETAILED DESCRIPTION OF THE INVENTION

Figure 1:
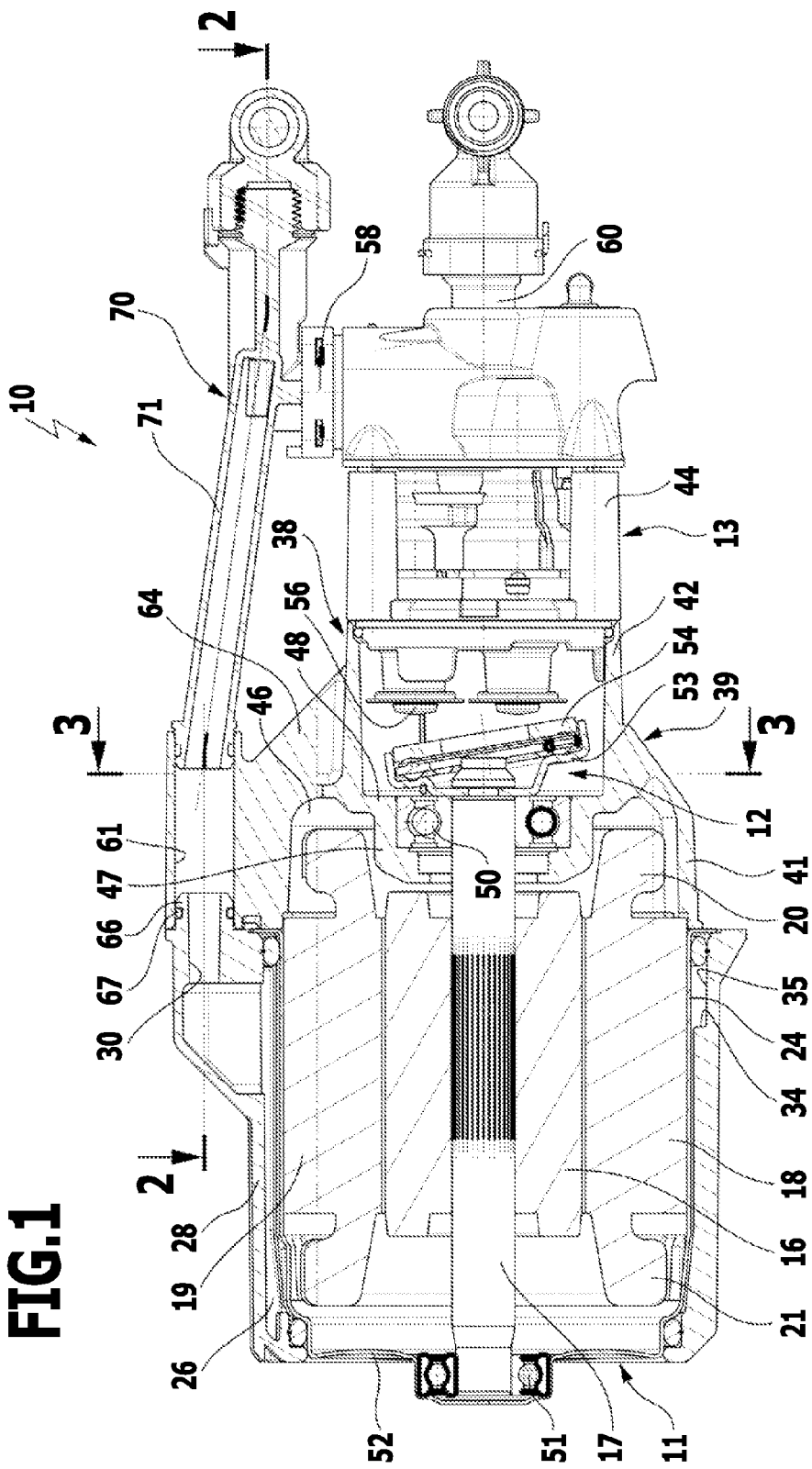
FIG. 1: is a partial sectional view of a motor pump unit.
Figure 2:
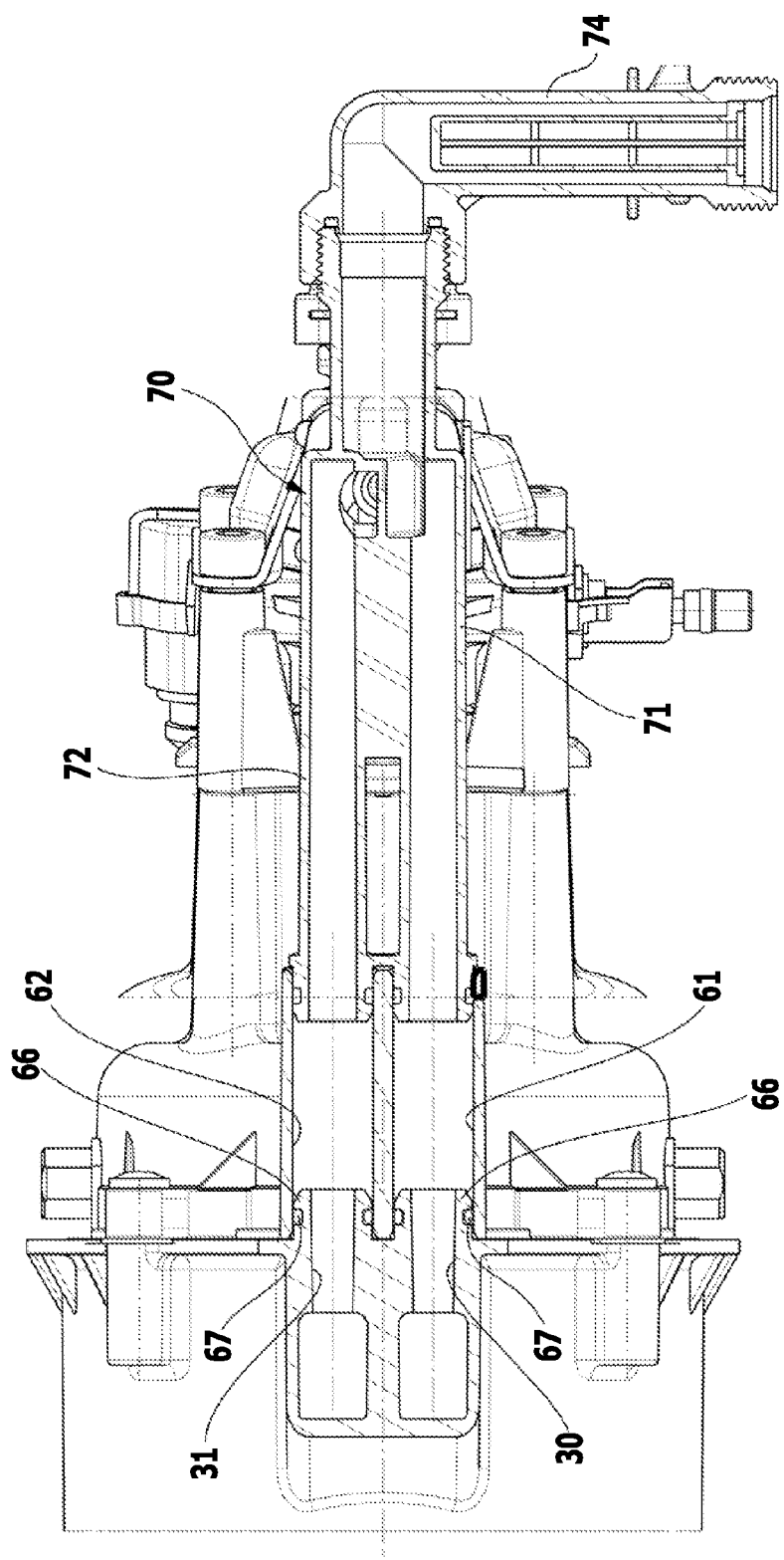
FIG. 2: is a sectional view taken along line 2-2 in FIG. 1.
Figure 3:
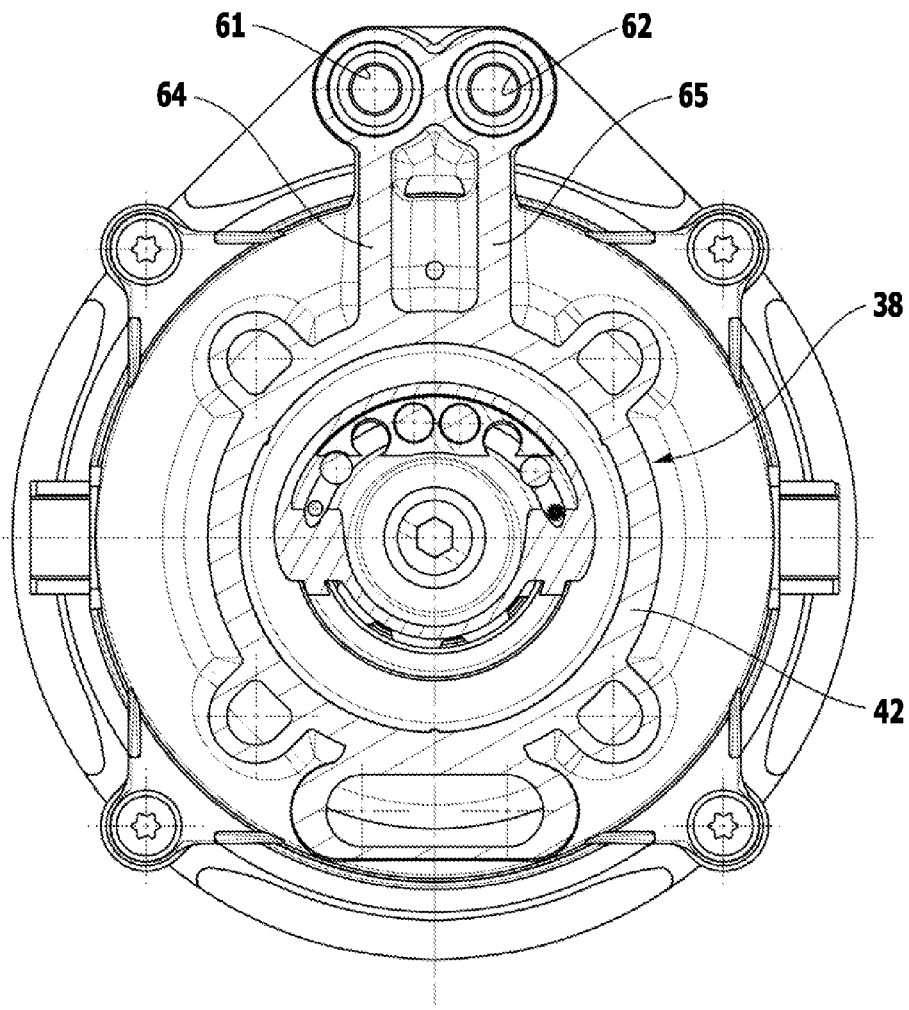
FIG. 3: is a sectional view taken along line 3-3 in FIG. 1.

The drawing is a schematic view illustrating a motor pump unit 10 in accordance with the invention which is used in high-pressure cleaning apparatuses. It has an electric motor 11 which drives reciprocating pistons 56 of a pump 13 via a swash drive 12. The electric motor 11 is configured as an asynchronous motor and has, in a conventional manner, a rotor 16 with a motor shaft 17, and a stator 18 with stator windings 19. The stator windings 19 form front winding heads 20 facing towards the pump 13 and rear winding heads 21 facing away from the pump 13. The stator 18 is surrounded by a cup-shaped motor housing 24 which is surrounded by a cylindrical shell shaped cooling housing 28 made of a plastics material with an annular space 26 formed therebetween. On its outside, the cooling housing forms an annular space inlet 30 and an annular space outlet 31. Via the annular space inlet 30, the annular space 26 can be supplied with liquid for cooling the electric motor 11. The liquid flows through the annular space 26 in a circumferential direction and can be discharged therefrom via the annular space outlet 31. Arranged within the annular space 26 are flow guide elements in the form of guide ribs 34 which are integrally formed on the inside of the cooling housing 28 and extend in an axial direction of the motor pump unit 10. Each of the guide ribs 34 has a through-passage 35 through which the liquid supplied to the annular space 26 can flow. The through-passages 35 of adjacent guide ribs 34 are arranged in an axially offset relation to one another, so that the guide ribs 34 as a whole define a labyrinth-like flow path leading around the motor housing 24 in a circumferential direction from the annular space inlet 30 to the annular space outlet 31.

The pump 13 has a drive housing 38 which is made of metal, preferably an aluminium alloy. It comprises a base body 39 having a motor-side wall section 41 which contacts the motor housing 24 at a face end thereof, and a pump-side wall section 42 which is followed in an axial direction by a pump housing 44. The motor-side wall section 41 surrounds an interspace 46 into which the front winding heads 20 extend and which is delimited on its inside by a bearing sleeve 47 which is integrally formed on the base body 39 via a step 48.

The motor shaft 17 is held for rotation on the bearing sleeve 47 via a first bearing 50. A second bearing 51 for the motor shaft 17 is held on the bottom 52 of the cup-shaped motor housing 24.

Held on the end of the motor shaft 17 facing towards the pump 13 is a swash drive 12 which is surrounded by the pump-side wall section 42 and has a swash body 53 on which a swash plate 54 is held for rotation. On a face end thereof, the swash plate 54 is contacted by a plurality of pistons 56 of the pump 13 which are driven for reciprocating movement by the swash plate 54. For the sake of clarity, the drawing shows the pistons 56 as being arranged at a distance from the swash plate 54.

In each case, the ends of the pistons 56 facing away from the swash plate 54 extend into a pump space in a manner known per se and therefore not shown in the drawing, said pump space being fluidly connected to a suction inlet 58 for drawing in liquid to be pressurized and to a pressure outlet 60 for discharging the pressurized liquid.

On its outside, the motor-side wall section 41 of the drive housing 38 has integrally formed thereon a first cooling passage 61 and a second cooling passage 62 which are aligned parallel to the motor shaft 17. The first cooling passage 61 is connected to the pump-side wall section 42 via a first heat-conductive rib 64, and the second cooling passage 62 is connected to the pump-side wall section 42 via a second heat-conductive rib 65. Protruding into each of the two cooling passages 61 and 62 is a connecting nipple 66 connected in one piece to the cooling housing 28 and aligned in line with the respective cooling passage 61 and 62 and surrounded by an O-ring 67. The first cooling passage 61 is connected in a fluid-tight manner to the annular space inlet 30 via the connecting nipple 66 associated with it, and the second cooling passage 62 is connected in a fluid-tight manner to the annular space outlet 31 via the connecting nipple 66 associated with it.

Connected to the two cooling passage 61 and 62 and to the suction inlet 58 is a conduit arrangement 70 made of a plastics material having a feed conduit 71 opening into the first cooling passage 61 and a connecting conduit 72 connecting the second cooling passage 62 to the suction inlet 58. Connected to the feed conduit 71 is a pipe connection piece 74 which, in turn, can have connected to it a feed hose not shown in the drawing. Via the pipe connection piece 74 and the feed conduit 71, the first cooling passage 61 can be supplied with liquid which then flows, via the annular space inlet 30, into the annular space 26 surrounding the motor housing 24 from where it can be supplied to the suction inlet 58 via the annular space outlet 31, the second cooling passage 62 and the connecting conduit 72 in order to then be pressurized by the pump 13 and discharged therefrom via the pressure outlet 60.

Thus, the liquid to be pressurized by the pump also serves to cool the drive housing 38 and the electric motor 11. Heat generated in the area of the first bearing 50 and the swash drive 12 can be supplied, via the base body 39 and the heat-conductive ribs 64 and 65, to the cooling passages 61 and 62 from where the heat is then dissipated to the liquid flowing through the cooling passages 61, 62. The provision of the heat-conductive ribs 64 and 65 ensures a heat conduction path of particularly low resistance from the base body 39 to the cooling passages 61 and 62. Waste heat generated in the area of the front winding heads 20 can also be absorbed by the drive housing 38 and dissipated to the liquid to be pressurized by the pump.

The liquid-cooled drive housing 38 thus prevents overheating in particular of the first bearing 50 and the swash drive 12 and also of the pump 13, in particular of a piston guide in which the pistons 56 are mounted for displacement.

The invention claimed is:

1. A motor pump unit for a high-pressure cleaning apparatus, comprising: an electric motor and a pump, the electric motor comprising a motor housing that is surrounded by a cooling housing with an annular space having an annular space inlet and an annular space outlet, the annular space being formed between the motor housing and the cooling housing, the pump comprising a drive housing on which is supported a motor shaft of the electric motor, a suction inlet for drawing in liquid, and a pressure outlet for discharging pressurized liquid, the annular space outlet being fluidly connected to the suction inlet, liquid to be pressurized by the pump being suppliable to the annular space inlet, the drive housing having at least one cooling passage which is arranged upstream of the suction inlet and which is adapted to have the liquid to be pressurized flow therethrough; and the drive housing comprising a base body having a motor-side wall section which contacts the motor housing, and a pump-side wall section which contacts a housing of the pump, the at least one cooling passage being disposed laterally alongside the motor-side wall section, external to the motor-side wall section; wherein: the base body is connected in one piece to the at least one cooling passage via at least one heat-conductive rib projecting outward from the base body; and the at least one heat-conductive rib is located between the base body and the at least one cooling passage.

2. The motor pump unit in accordance with claim 1, wherein: the drive housing has a first cooling passage and a second cooling passage, the first cooling passage is connected to the annular space inlet and the second cooling passage is connected to the annular space outlet.

3. The motor pump unit in accordance with claim 1, wherein the drive housing, including the at least one cooling passage, is made of metal.

4. The motor pump unit in accordance with claim 1, wherein the at least one heat-conductive rib comprises two heat-conductive ribs aligned parallel to each other, each heat-conductive rib arranged between one of the at least one cooling passage and the base body.

5. The motor pump unit in accordance with claim 1, wherein: the drive housing has a bearing sleeve on which the motor shaft is supported for rotation and which is surrounded by a circumferential wall section of the drive housing with an annular interspace formed therebetween, winding heads of the electric motor protrude into the interspace, and the at least one cooling passage is integrally formed on an outside of the circumferential wall section.

6. The motor pump unit in accordance with claim 1, wherein the drive housing surrounds a swash drive held on the motor shaft.

7. The motor pump unit in accordance with claim 1, wherein the cooling housing is configured in the form of a cylindrical shell which is adapted to be slid in an axial direction onto the motor housing and to be detachably connected to the drive housing with a liquid-tight connection established between the at least one cooling passage and the annular space inlet or the annular space outlet.

* * * * *